United States Patent [19]

Geis et al.

[11] 4,373,547
[45] Feb. 15, 1983

[54] DOME FUNNEL

[75] Inventors: William A. Geis, Woodbridge; Carl H. Frimodig, Jr., Middletown, both of N.J.

[73] Assignee: Shell Oil Company, Houston, Tex.

[21] Appl. No.: 220,661

[22] Filed: Dec. 29, 1980

[51] Int. Cl.³ .................... F16L 35/00; B67D 5/00
[52] U.S. Cl. ................................ 137/377; 137/382; 220/256; 312/1
[58] Field of Search .............. 220/256; 137/377, 382, 137/577; 312/1

[56] References Cited

U.S. PATENT DOCUMENTS

| 1,190,713 | 7/1916 | Bokop | 137/577 |
| 3,395,957 | 8/1968 | Peele | 312/1 |
| 3,806,952 | 4/1974 | Viciulis | 312/1 |

FOREIGN PATENT DOCUMENTS 222321 6/1957 Australia ............... 137/577

Primary Examiner—Alan Cohan
Assistant Examiner—John A. Rivell

[57] ABSTRACT

A dome funnel is provided for the removal of product from an overturned delivery vehicle.

9 Claims, 2 Drawing Figures

DOME FUNNEL

BACKGROUND OF THE INVENTION

Tank truck rollover accidents require the attention of trained emergency response teams as well as police and fire personnel in order to safely handle such incidents. The objectives of the trained emergency response teams are to protect people, to minimize impact on environment and to contain and recover product. Methods are preferred for gaining entry to tank compartments and removing product which minimize the potential to spill additional product. Emphasis is placed on planned, careful action with strong attention to safety precautions, techniques, procedures and equipment.

Stabilizing the situation is the first job of the emergency response team in attending to a rolled-over tank truck, even before deciding on a specific product recovery method. A first task is to monitor the air for vapor content. If vapor concentrations approach unsafe levels, the area is cleared and foamed down until the atmosphere is safe to work in. Tank compartments are checked for leaks, and if a dome cover is leaking, an attempt is made to slow down or stop the leaking. Product from any leaking that cannot be stopped completely is collected in containers or diverted away from active work areas. Absorbent materials or earth or sand dams may be used to confine product to a limited area. Finally, bracing the overturned tanker is important since its weight will change during the pumpoff operation, and the tanker may shift causing further product spill.

With the situation stabilized, the emergency response team decides on the product recovery method best suited to the circumstances and confers with authorities. In many cases it will be desirable to employ a combination of methods to remove product safely. Grounding and bonding to prevent static electric sparks which could cause fire or explosion is a must when working with gasoline or other flammable liquids. The rolled vehicle is grounded through a rod with the cable connected to the trailer first and then to the rod. Additional grounding and bonding precedes any flow of product from one container to another. Pumpoff vehicle, down spouts, hose couplings, recovery pans and tubs are all grounded. The pumpoff vehicle or vacuum truck is brought up to the side of the overturned tanker and positioned uphill and upwind since its engine and exhaust system could be a source of ignition.

It frequently is necessary to remove product from tankers through a dome opening which would normally be at the top of the tank. If this is the case, there is a particular problem with spillage of fluid inasmuch as a dome cover is held in place by a lever which must be released and some connection made to the dome opening prior to recovery of product. In the past, spillage has been almost inevitable in this process, and the danger to environment and workmen removing product has been a substantial hazard. Accordingly, there is a need in the art for a technique whereby product may be removed from a dome cover of a rolled over tank without spillage and without resulting hazard to workmen.

SUMMARY OF THE INVENTION

The present invention pertains to a process and apparatus for removing product from a dome opening of a rolled-over tank truck without spillage. More particularly, the present invention provides a dome funnel attachable to the dome opening, preferably with a gasket around the perimeter of the dome opening to form a seal with the dome funnel. The dome funnel has an outlet to which a pumpoff hose is attached. A flexible mitten is built into the dome funnel through which an operator may open a dome cover to allow product to flow out of the dome opening and into the dome funnel and then out of the dome funnel via the pumpoff hose.

DESCRIPTION OF PREFERRED EMBODIMENTS

Figure 1:
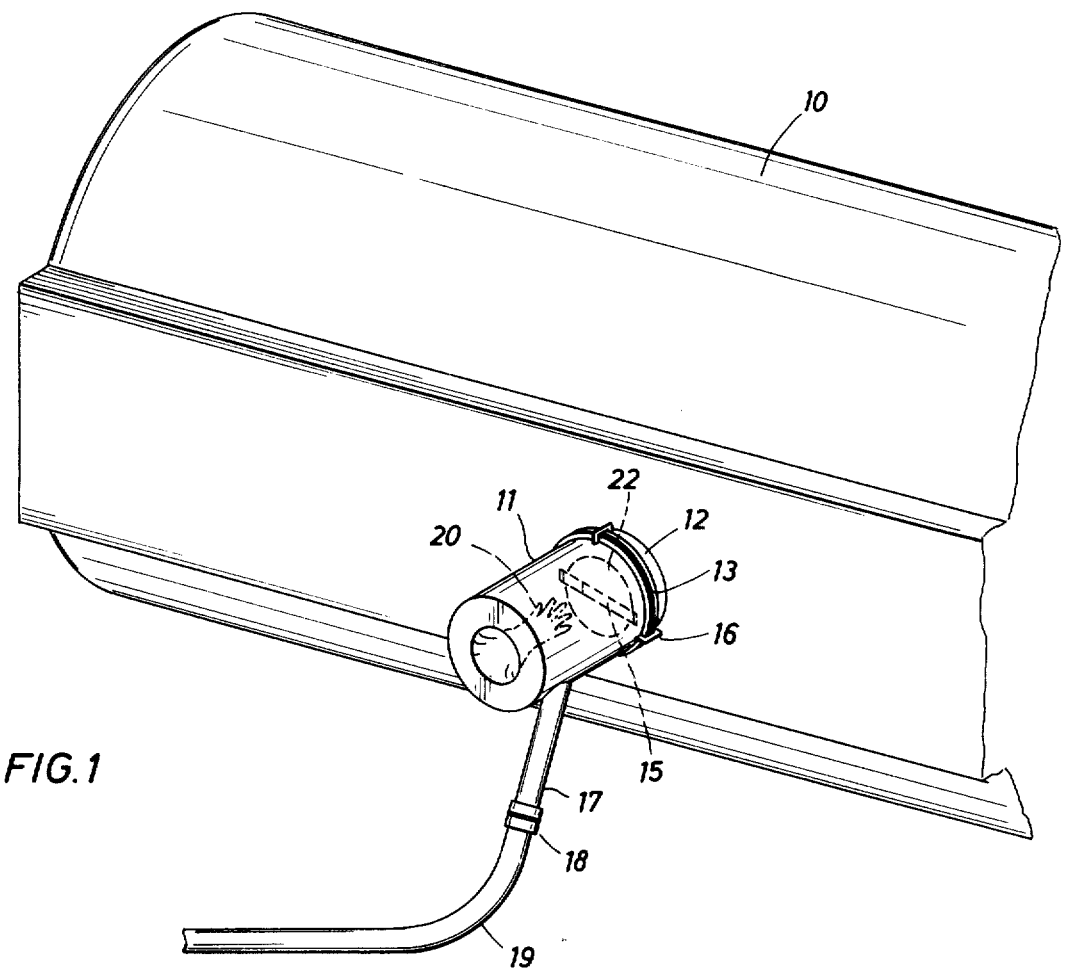
FIG. 1 provides a view of a rolled-over vehicle with a dome funnel attached to a dome opening.
Figure 2:
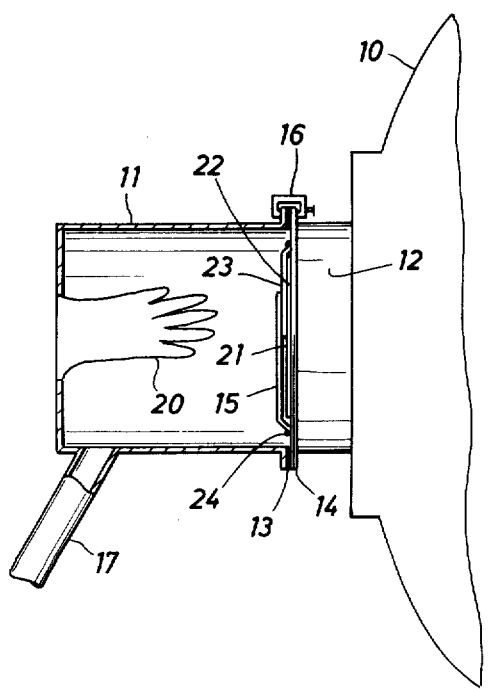
FIG. 2 is a cross-sectional view of the dome funnel.

As shown in FIG. 1, entry to a tank compartment 10 can be made through a funnel 11 placed over dome hatch 12. An opening in the hatch is covered by dome cover 22. The funnel 11 is preferably aluminum, although another metal or plastic may be employed, depending upon reactivity with the contents of tank compartment 10. In using the dome funnel 11, the response action team applies a temporary seal or gasket 13 around the perimeter or lip 14 of the dome hatch to form a seal between the tank 10 and the dome funnel 11. The funnel 11 is aligned and tightened either by C-clamps 16, channel locks, or other means. Funnel outlet pipe 17 preferably has a threaded end or other coupling 18 to which is attached a pumpoff hose 19. If desired, pipe 17 or pumpoff hose 19 can be provided with a valve (not shown).

In operating the dome funnel unit, a pump (not shown) at the other end of hose 19 is started, after which one of the team members reaches in through mitten 20 built into the funnel 11 and slowly opens the dome cover 21 by releasing lever 15, which in turn holds down arm 23. Lever 15 may be secured at its hinge 24 by a tensioned spring (not shown). If there are no leaks between the dome funnel 11 and the dome hatch 12, the dome cover 22 is maintained open, and product is pumped out to the level of the dome cover in tank 10. Then, the funnel 11 may be removed and the remainder of product in tank 10 can be removed by other means.

What is claimed is:

1. Apparatus for removing fluid through a dome hatch of a rolled-over tanker comprising, an open-ended container having a fluid outlet means, means for attaching the open end of the container to the dome hatch, and a flexible mitten extending inwardly of the container to the proximity of the open end.

2. The apparatus of claim 1 including a clamp to attach the container to the perimeter of the dome hatch and form a liquid-tight seal between the hatch and the container.

3. The apparatus of claim 2 wherein a gasket is secured between the container and the dome hatch.

4. The apparatus of claim 1 wherein the mitten is neoprene.

5. The apparatus of claim 1 wherein the outlet means has a threaded end to which a pumpoff hose is secured.

6. A process for removing liquid product through a dome hatch of a rolled-over tanker, comprising, attaching an open-ended container to the dome hatch, the container having a flexible mitten extending thereinto, reaching into the container via the mitten and opening a dome cover on the dome hatch to release product into the container, and removing product from the container.

7. The process of claim 6 wherein a gasket is secured between the container and the dome cover to prevent leakage therebetween.

8. the process of claim 7 wherein product is removed from the container via a pipe and a pumpoff hose is connected to the pipe.

9. The process of claim 6 wherein the dome cover is opened by releasing a lever over the dome cover.

* * * * *